(12) United States Patent
Iskandar et al.

(10) Patent No.: US 10,303,812 B2
(45) Date of Patent: May 28, 2019

(54) TOPOGRAPHY PREDICTION USING SYSTEM STATE INFORMATION

(71) Applicant: Applied Materials, Inc., Santa Clara, CA (US)

(72) Inventors: Jimmy Iskandar, Fremont, CA (US); Chong Jiang, Cupertino, CA (US); Michael D. Armacost, San Jose, CA (US); Bradley D. Schulze, Phoenix, AZ (US)

(73) Assignee: Applied Materials, Inc., Santa Clara, CA (US)

( * ) Notice: Subject to any disclaimer, the term of this patent is extended or adjusted under 35 U.S.C. 154(b) by 234 days.

(21) Appl. No.: 15/231,487

(22) Filed: Aug. 8, 2016

(65) Prior Publication Data

US 2017/0045573 A1    Feb. 16, 2017

Related U.S. Application Data

(60) Provisional application No. 62/203,229, filed on Aug. 10, 2015.

(51) Int. Cl.
*G06F 17/50* (2006.01)
*H01L 21/66* (2006.01)
*G01R 31/28* (2006.01)

(52) U.S. Cl.
CPC .......... *G06F 17/50* (2013.01); *G06F 17/5068* (2013.01); *G01R 31/2831* (2013.01); *G06F 2217/10* (2013.01); *H01L 22/12* (2013.01)

(58) Field of Classification Search
USPC ......................................................... 716/54
See application file for complete search history.

(56) References Cited

U.S. PATENT DOCUMENTS

| | | | |
|---|---|---|---|
| 2005/0132306 A1* | 6/2005 | Smith | G06F 17/5068 716/114 |
| 2016/0034632 A1* | 2/2016 | Inoue | G03F 1/84 716/53 |

* cited by examiner

*Primary Examiner* — Eric D Lee
(74) *Attorney, Agent, or Firm* — Patterson + Sheridan, LLP

(57) ABSTRACT

Embodiments presented herein provide techniques for predicting the topography of a product produced from a manufacturing process. One embodiment includes generating a plurality of prediction models. Each of the plurality of prediction models corresponds to a respective one of a plurality of positional coordinates of a product produced from a manufacturing process. The method also includes receiving a set of user-specified input parameters to apply to the manufacturing control process. The method further includes generating a graphical representation of a topography map for the product for the user-specified of input parameters based on the plurality of prediction models.

20 Claims, 10 Drawing Sheets

US 10,303,812 B2

TOPOGRAPHY PREDICTION USING SYSTEM STATE INFORMATION

CROSS-REFERENCE TO RELATED APPLICATION

This application claims benefit of U.S. Provisional Patent Application Ser. No. 62/203,229, filed on Aug. 10, 2015, and titled "TOPOGRAPHY PREDICTION USING SYSTEM STATE INFORMATION," which is incorporated by reference herein in its entirety.

BACKGROUND

Field

Embodiments of the present disclosure generally relate to manufacturing processes, and more particularly to techniques for predicting the topography of a product produced from a manufacturing process.

Description of the Related Art

In many manufacturing industries, the geometry of devices continues to decrease in size since such devices were first introduced several decades ago. In semiconductor manufacturing, for example, integrated circuits have generally followed "Moore's Law," which states that a number of devices fitting on a chip will double every two years. As the demand for higher yield devices is expected to increase further yet, the need to achieve high-yield, high quality devices has prompted issues not previously considered to emerge as areas of concern. One such issue relates to the topography of a product produced from a manufacturing process.

Generally, in manufacturing, the topography of a product that results from production is often a key factor that relates to the quality and/or yield of the product. For example, in semiconductor manufacturing, many processes (e.g., such as deposition, etching, oxidation, etc.) used in the fabrication of semiconductor devices can result in changes in the shape and/or composition of a wafer surface. Such changes, in turn, can result in significant differences in yield of the product (e.g., the number of good die on the wafer), final feature quality of the product (e.g., aspect ratio or some other quality associated with features, such as trenches, contact holes, vias, etc.), and/or performance of the product (e.g., insulating properties, etc.). As such, improved control over the resulting topography of a product produced from a manufacturing process is necessary to ensure that the final product does not have low yield, low quality, and/or low performance.

Currently in manufacturing, topography and its impact is typically assessed post-process. For example, conventional techniques typically rely on yield management systems, post-process, to detect potential yield issues with a resulting product (e.g., detecting whether a percentage yield loss is present in the product). Once the issues are identified, the conventional techniques rely on data mining to identify the processes and/or process settings that should be adjusted. Assessing topography, however, in this manner is extremely inefficient and time-consuming. For example, closing the loop (e.g., finding the optimal process settings, processes, etc.) can often take weeks, during which significant quality reduction and/or yield loss can occur until the problem is identified, appropriate corrective action is determined, and the corrective action is implemented.

In addition, other conventional techniques that attempt to address the above issues typically perform post-process metrology data monitoring and mining to identify topographical anomalies and relate the identified anomalies to processing issues in the manufacturing process. These techniques, however, are also inefficient at correcting any identified problems, as these techniques are post-process techniques and as such do not prevent the current product (e.g., wafer lot, etc.) from having low yield, quality, or performance. For example, with these techniques, once topographical anomalies are identified, the techniques typically rely on manual (or human guided) methods to correct parameters of the current process (and possibly upstream processes) to reduce the problem for future wafers. However, performing a correction process in this manner leads to inexact results (e.g., due to human error), is not always immediate, and is incapable of improving yield of the current product or product lot.

SUMMARY

Embodiments disclosed herein include methods, systems, and computer program products for predicting the topography of a product produced from a manufacturing process. In one embodiment, a method for predicting the topography of a product produced from a manufacturing process is disclosed. The method includes generating a plurality of prediction models. Each of the plurality of prediction models corresponds to a respective one of a plurality of positional coordinates of a product produced from a manufacturing process. For example, generating the plurality of prediction models includes, for each of the plurality of prediction models, measuring, for each of a plurality of sets of input parameters, by operation of one or more sensor devices, for each of a plurality of sets of input parameters, a sensor value at the corresponding positional coordinate, during a respective iteration of the manufacturing process that is configured using the set of input parameters. A respective prediction model is then generated, based on the plurality of measured sensor values. The method also includes generating a graphical representation of a topography map for the product for a user-specified set of input parameters. For example, generating the graphical representation includes determining, for each of the plurality of prediction models, a respective predicted value for the corresponding positional coordinate of the product, and generating, using an interpolation function, a predicted value for at least one other positional coordinate of the product not included in the plurality of positional coordinates.

Another embodiment provides a non-transitory computer-readable medium containing computer program code that, when executed, performs an operation. The operation includes generating a plurality of prediction models. Each of the plurality of prediction models corresponds to a respective one of a plurality of positional coordinates of a product produced from a manufacturing process. For example, generating the plurality of prediction models includes, for each of the plurality of prediction models, measuring, for each of a plurality of sets of input parameters, by operation of one or more sensor devices, for each of a plurality of sets of input parameters, a sensor value at the corresponding positional coordinate, during a respective iteration of the manufacturing process that is configured using the set of input parameters. A respective prediction model is then generated, based on the plurality of measured sensor values. The operation also includes generating a graphical representation of a topography map for the product for a user-specified set of input parameters. For example, generating the graphical representation includes determining, for each of the plurality of prediction models, a respective predicted value for the corresponding positional coordinate of the product, and generating, using an interpolation function, a predicted value for at least one other positional coordinate of the product not included in the plurality of positional coordinates.

Still another embodiment provides a manufacturing system. The manufacturing system includes a plurality of tools for manufacturing one or more semiconductor devices, at least one processor, and a memory. The memory stores a computer program that, when executed by the at least one processor, performs an operation. The operation includes generating a plurality of prediction models. Each of the plurality of prediction models corresponds to a respective one of a plurality of positional coordinates of a semiconductor wafer produced from a manufacturing process. For example, generating the plurality of prediction models includes, for each of the plurality of prediction models, measuring, for each of a plurality of sets of input parameters, by operation of one or more sensor devices, for each of a plurality of sets of input parameters, a sensor value at the corresponding positional coordinate, during a respective iteration of the manufacturing process that is configured using the set of input parameters. A respective prediction model is then generated, based on the plurality of measured sensor values. The operation also includes generating a graphical representation of a topography map for the semiconductor wafer for a user-specified set of input parameters. For example, generating the graphical representation includes determining, for each of the plurality of prediction models, a respective predicted value for the corresponding positional coordinate of the semiconductor wafer, and generating, using an interpolation function, a predicted value for at least one other positional coordinate of the semiconductor wafer not included in the plurality of positional coordinates.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
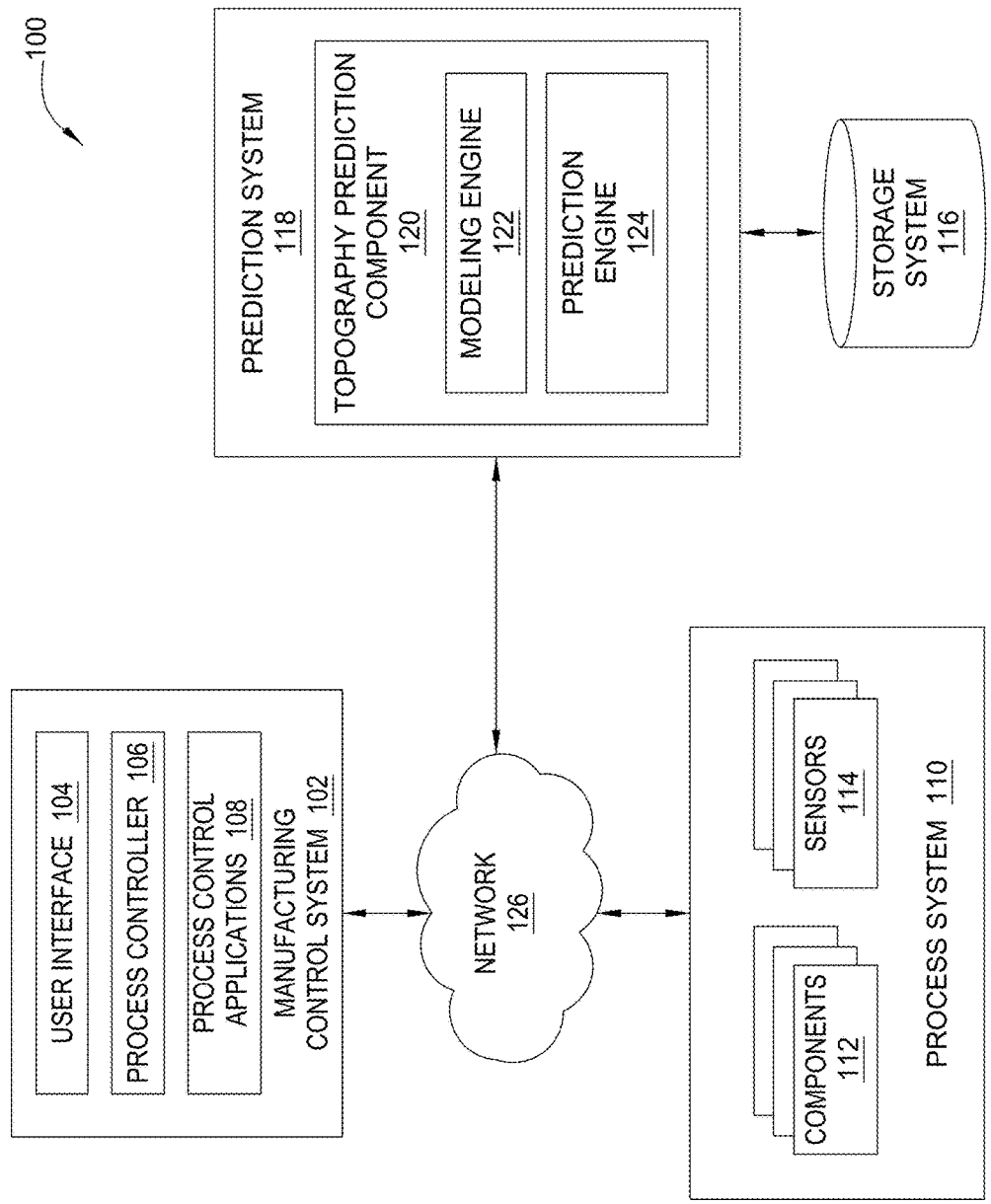
FIG. 1 illustrates a block diagram of an example architecture of a manufacturing system that includes a topography prediction component, in accordance with embodiments of the present disclosure.

To facilitate understanding, identical reference numerals have been used, wherever possible, to designate identical elements that are common to the Figures. Additionally, it is contemplated that elements disclosed in one embodiment may be beneficially used in other embodiments described herein without specific recitation.

DETAILED DESCRIPTION

Embodiments presented herein present methods, computer-program products, and systems for predicting the topography (e.g., surface shape and/or composition) of a product produced from a manufacturing process. As will be described in more detail below, embodiments presented provide techniques to predict the potential occurrence of quality and/or yield issues (e.g., resulting from a set of input parameters, etc.) for a product, techniques to investigate the problem along with any potential solutions, and techniques to automatically provide an optimized solution to reduce (or prevent) the occurrence of quality and/or yield issues for the product. As also described in more detail below, the techniques presented herein can be used to determine one or more optimized parameter settings (e.g., to apply to a manufacturing process) given a set of input and output constraints (e.g., maximum and minimum threshold values, granularity of adjustment capability, weighting indicating input parameter adjustment preference, etc.) and objectives. As such, the embodiments presented herein allow manufacturing systems to substantially reduce (e.g., compared to traditional techniques) the occurrence of quality and/or yield degradation of a product that can result due to topographical issues.

One embodiment includes a method for predicting a topography map of a product produced from a manufacturing process. The method includes generating (by a topography prediction (TP) component) a plurality of prediction models, where each of the plurality of prediction models corresponds to a respective one of a plurality of positional coordinates of a product produced from a manufacturing process. For example, to determine each respective prediction model, the TP component measures (e.g., by operation of one or more sensor devices), for each of a plurality of sets of input parameters, a sensor value at the respective positional coordinate during a respective iteration of the manufacturing process that is configured using the respective set of input parameters. The TP component then generates, for each respective positional coordinate, a prediction model based on the plurality of measured sensor values.

The TP component further generates a graphical representation of a topography map for the product for a user-specified set of input parameters. For example, the TP component determines, for each of the plurality of prediction models, a respective predicted value for the respective positional coordinate of the product. The TP component then generates, using an interpolation function, a predicted value for at least one other positional coordinate of the product not included in the plurality of positional coordinates. The topography map for the user specified set of input parameters is then generated from the determined predicted values and the generated predicted values. Doing so in this manner allows manufacturing systems to quickly identify and solve any potential topographical issues that could affect the quality and/or yield of a product.

Note that, in the following description, many of the following embodiments use semiconductor wafer processing as a reference example of a manufacturing process where the techniques for topography prediction described herein can be used to significantly improve (compared to traditional methods) the quality and/or yield of semiconductor wafers. Note, however, that the techniques presented herein can also be applied in other industries, to other manufacturing processes, or, in general, any area where topography or an aspect of topography is altered by a process and the topography impacts the quality or yield of a desired output. For example, applications could include semiconductor wafer processing, display panel processing, a variety of different machining processes, solar processing, etc. Further, in some cases, the techniques could also be implemented outside of production (e.g., applied to analysis, design, etc. in a variety of different fields).

FIG. 1 is a block diagram illustrating an architecture 100, in which aspects of the present disclosure may be practiced. For example, in one embodiment, the architecture 100 is an example of a manufacturing system (or environment), such as a semiconductor manufacturing system. As described below, in one embodiment, the techniques presented herein allow the manufacturing system to predict the topography of a product (such as a semiconductor wafer, etc.) given a user-specified set of input parameters (e.g., a recipe setting that is to be applied to a semiconductor manufacturing process, etc.). Alternatively, or additionally, embodiments also allow the manufacturing system to determine an optimal set of input parameters (such as an optimized recipe setting) to apply to a manufacturing process, given a set of multiple input and output constraints and objectives. The objectives, in general, can be any set of objectives with a goal that minimizes or maximizes one or more physical properties of the product.

As shown, the architecture 100 includes a manufacturing control system (MCS) 102, process system 110 and a prediction system 118 connected via a network 126. In general, the network 126 can be a wide area network (WAN), local area network (LAN), wireless LAN (WLAN), etc. The MCS 102 and prediction system 118 can be any kind of physical computing system having a network interface, such as a desktop computer, laptop computer, mobile device, tablet computer, server computing systems, and the like.

Process system 110 includes components 112 and sensors 114. The components 112, in some embodiments, can represent tools, equipments, systems, chambers, pumps, etc., that are used for one or more manufacturing processes (e.g., semiconductor processing, solar processing, flat panel processing, LED processing, etc.) within process system 110. In the case of semiconductor manufacturing, for example, components 112 can include an etch chamber, a chemical vapor deposition (CVD) chamber, a physical vapor deposition (PVD) chamber, an atomic layer deposition (ALD) chamber, an implant chamber, an annealing chamber, a plasma treatment chamber, or other processing chamber, either alone or in combination with one or more other chambers. In one example, process system 110 can produce one or more semiconductor wafers and can use a manufacturing process, such as a PVD process, CVD process, ALD process, etc., to deposit one or more films on the semiconductor wafers.

Sensors 114 are generally configured to measure one or more attributes of a product produced within the process system 110. For example, sensors 114 can include metrology equipment used for measuring an attribute of a substrate (such as sheet resistance, temperature, thickness, etc.) of a substrate (e.g., a semiconductor wafer) produced within process system 110. In some embodiments, the metrology equipment may measure critical dimensions across the substrate and alter process parameters to change processing, by components 112, of the substrate. In some embodiments, sensors 114 may be incorporated within one or more components 112. In other embodiments, sensors 114 may be located external to one or more components 112, or other convenient location.

The MCS 102 is generally configured to control, via process controller 106, components 112 within process system 110. Process controller 106, in general, can control all aspects of operation of the process system 110 via direct control of components 112 and sensors 114 within process system 110, and/or via one or more other controllers (not shown) coupled to components 112 within process system 110. In one embodiment, the process controller 106 can control the process recipes in one or more of the components 112. For example, the process controller 106 may control vacuum, chamber temperature, radio frequency (RF), power, gas flow rate, capacitance, spacing (e.g., between a wafer and target), and various other processing parameters of the process recipe. In embodiments, the process controller 106 uses feedback from sensors 114 to monitor a substrate undergoing processing in the process system 110, and determines based, in part, on the feedback whether to alter the process recipe.

As shown, the MCS 102 also includes a plurality of process control applications 108 for interacting with the process controller 106 to control operation of process system 110. In general, the MCS 102 can support a variety of process control applications 108 used for advance process control (APC) and/or management of components 112 in process system 110. Examples of various applications related to APC that can be implemented by MCS 102 include, but are not limited to, applications for fault detection (FD), run-to-run (R2R) control, equipment performance tracking (EPT) (e.g., of components 112), statistical process control (SPC), etc.

The MCS 102 also includes a user interface 104 (e.g., a graphical user interface (GUI)) that allows a user to interact with any of the components within the architecture 100. For example, as described below, using the user interface 104, a user can select one or more specific components 112 to perform processing, apply one or more user-defined process parameters (e.g., one or more process recipes, etc.), receive input and output information (e.g., property and performance statistics regarding a resulting product produced in the process system 110), topography map information, etc. Additionally, as described below, the techniques presented herein also allow a user (via the user interface 104) to adjust process parameters and determine (in real-time) the impact of adjusting the process parameters on the topography of a product. For example, as a user continually adjusts one or more inputs for a manufacturing process (e.g., for semiconductor wafers), embodiments can determine in real-time predicted topography maps for a semiconductor wafer corresponding to the different inputs. Further, embodiments allow a user (via the user interface 104) to determine an optimized set of process parameters for a given set of input and output constraints and a list of objectives (e.g., for the topography) for the product. As such, the user interface 104 (with the techniques presented herein) provides an improved investigation tool, compared to traditional tools, for investigating potential issues with a product and determining an optimal set of inputs (process parameters) to achieve a particular topography.

Advanced manufacturing systems typically support various different predictive applications to improve the control of their systems. Some of these applications include applications for predictive maintenance, yield prediction, virtual metrology, and the like. These predictive applications, however, are insufficient for efficiently determining the impact of topography on the quality and/or yield of a product produced from a manufacturing process. For example, as mentioned above, for many of these techniques, identifying topography and its impact on a particular product takes a significant period of time (e.g., weeks in some cases). Further, many of these techniques typically do not assess topography and its impact across the entire product. For example, in these techniques, typically only a portion (such as the middle or center) of the product is assessed to determine topography at the portion, while other portions (such as edges of the product) are not considered. As the drive to increase yield and quality of devices continues to increase, however, it is becoming increasingly more important to consider topography at edges of the product, for example, to determine whether uniformity exists across the entire surface of a product.

Accordingly, as shown, the prediction system 118 includes a topography prediction (TP) component 120, which allows the MCS 102 to efficiently determine the topography of a product produced within process system 110 and its impact on the quality and/or yield of the product. The TP component 120 generally represents logic (e.g., a software application, device firmware, an ASIC, etc.) that is configured to implement one or more of the techniques presented herein. For example, the TP component 120 could perform method 400 illustrated in FIG. 4, method 500 illustrated in FIG. 5, method 600 illustrated in FIG. 6 and/or method 700 illustrated in FIG. 7.

The TP component 120 includes a modeling engine 122 and a prediction engine 124. As described in more detail below (e.g., in FIGS. 2, and 4-7), the modeling engine 122 is configured to generate (e.g., based on sensor data) a plurality of prediction models (or positional coordinate models) for a product produced within process system 110, where each of the plurality of prediction models corresponds to a respective one of a plurality of positional coordinates of the product. Doing so in this manner allows the TP component 120 to determine topography across the entire surface of a product (as opposed to only determining, with conventional techniques, topography at the center of a product).

Further, as also described in more detail below (e.g., in FIGS. 2 and 4-7), the prediction engine 124 is configured to determine, for each of the plurality of prediction models, a respective predicted value for the respective positional coordinate of the product. In one embodiment, the predicted value corresponds to a predicted measurement value of particular physical property (e.g., thickness, resistivity, temperature, surface roughness, etc.) of the product at the respective positional coordinate. The prediction engine is also configured to generate, using an interpolation function, a predicted value for at least one other positional coordinate of the product not included in the plurality of positional coordinates.

The prediction engine 124 then generates a graphical representation of a topography map for the product for a user-specified set of input parameters based, at least in part, on the determined predicted values and the generated predicted values. Such topography map can be displayed to a user via the user interface 104. The user can then interactively adjust, via the user interface 104, one or more input parameters to investigate, in real-time, the impact on the topography of the product. Doing so allows a user to proactively determine the impact different values for input parameters of a manufacturing process (e.g., semiconductor manufacturing process) may have on the topography of a product produced from the manufacturing process (e.g., semiconductor wafer), as opposed to conventional techniques which typically assess the topography impact post-process.

In the depicted embodiment, the prediction system 118 is coupled to storage system 116 and can use storage system 116 to store data received from sensors 114A-N, prediction models produced by modeling engine 122, positional coordinates for a product produced by the process system 110, predicted values, generated topography maps, and other information. In one embodiment, the storage system 116 represents an example of a database, such as an Oracle® database. In other embodiments, the storage system could be a storage system that uses an Apache™ Hadoop® based technology, such as a Hadoop Distributed Filing System (HDFS). Of course, one of ordinary skill in the art will recognize that such examples are provided for illustrative purposes only, and more generally, embodiments may be configured to use any type of storage system, or combination of storage systems.

Note, however, that FIG. 1 illustrates merely one possible arrangement of the architecture 100. More generally, one of ordinary skill in the art will recognize that other embodiments of manufacturing systems can also be configured to implement topography prediction in accordance with the techniques presented herein. For example, although MCS 102 and prediction system 118 are shown as separate entities, in other embodiments, the MCS 102 and prediction system 118 can be included as a part of one computing system. Further, although the illustrated prediction system 118 includes only the TP component 120, the prediction system 118 could also include other predictive applications, such as those used for predictive maintenance, virtual metrology, and the like.

Figure 2:
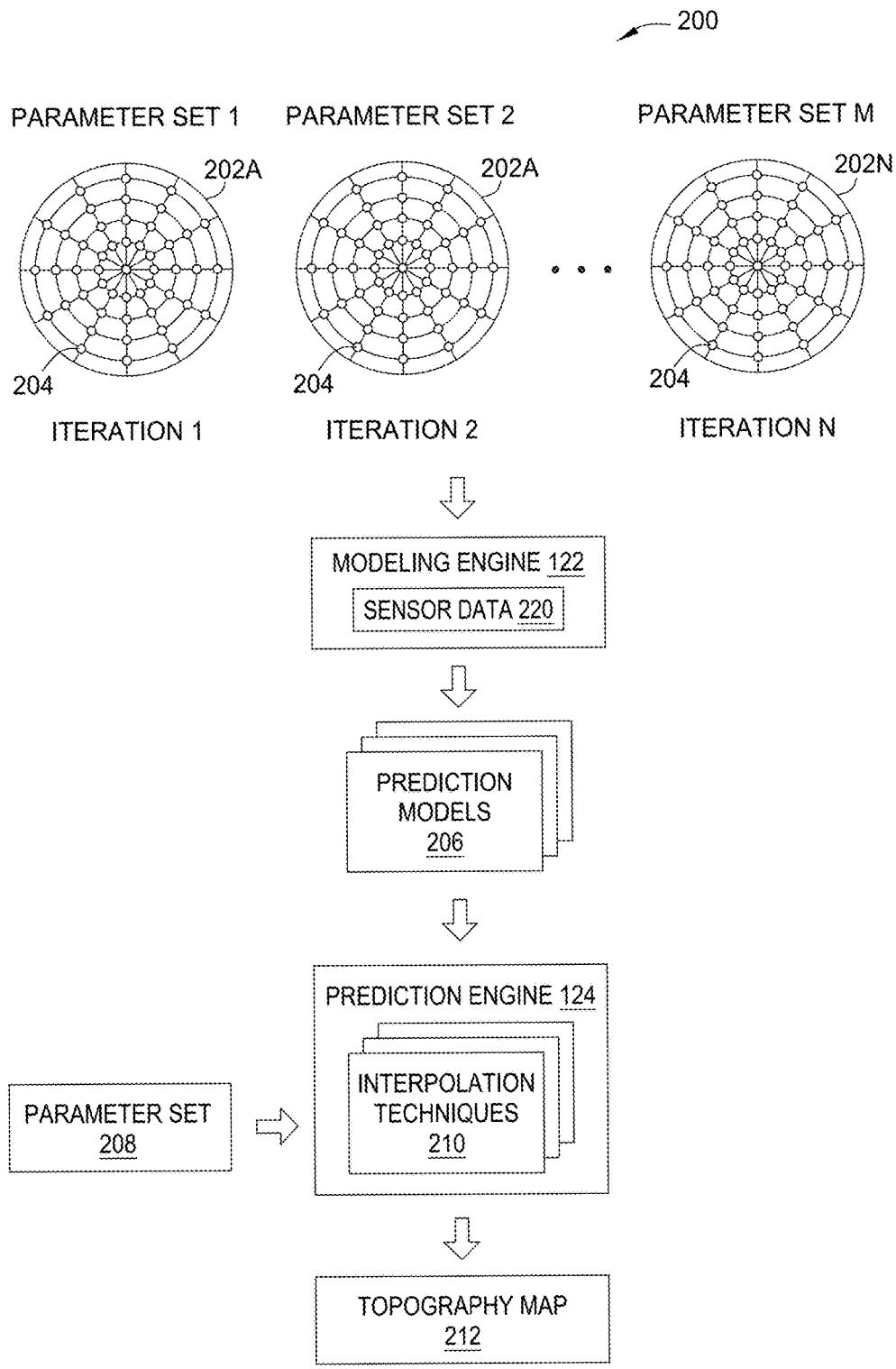
FIG. 2 illustrates a block diagram of a topography prediction component determining a topography map, in accordance with embodiments of the present disclosure.

FIG. 2 illustrates an example scenario 200 of the TP component 120 determining a topography map, according to one embodiment. To generate a plurality of prediction models, the TP component 120 first performs, for each of a plurality of sets of input parameters (e.g., parameter set 1, parameter set 2, . . . , parameter set M), an iteration of the manufacturing process (e.g., iteration 1, iteration 2, . . . , or iteration N) that is configured using the respective set of input parameters. In general, each iteration of the manufacturing process may be performed for a different wafer (e.g., one of wafers 202A-N). These N wafers typically correspond to one design of experiment (DOE) used to determine relationships between various inputs and outputs. The number N of iterations can depend on one or more various criteria, such as the manufacturing process complexity, tool complexity, etc. In one embodiment, the number N of iterations corresponds to the number of parameters in a particular parameter set (e.g., five iterations if there are five parameters in parameter set 1).

During each iteration, the TP component 120 measures, by operation of sensors 114, a sensor value at each positional coordinate 204 for the respective wafer 202. At each positional coordinate 204 of a given wafer, the TP component 120 may receive a measured sensor value for each sensor 114, where each sensor value corresponds to a measurement of a physical property of the respective wafer. For example, in one embodiment, if there are two sensors 114 (one for measuring thickness and one for measuring temperature), the TP component 120 would receive two measured sensor values (e.g., for thickness and temperature) at each positional coordinate 204 of a given wafer.

In one embodiment, after the TP component 120 completes the measurement process for the current iteration, the TP component 120 varies one or more parameter values in the next parameter set (e.g., parameter set 2) from their respective values in the previous parameter set (e.g., parameter set 1). The TP component 120 then performs the measurement process for the second wafer (e.g., wafer 202B). In general, this process continues until the TP component 120 measures a sensor value at each respective positional coordinate 204 (of wafer N) during an iteration N of the manufacturing process that is configured using parameter set N. Doing so in this manner provides the TP component 120 with a set of historical data that the TP component 120 can use to develop prediction models. Each of these prediction models relates system states to one or more values relating to the topography (e.g., thickness) at the respective positional coordinate. Note that although FIG. 2 illustrates one particular pattern of two-dimensional $(x_i, y_i)$ positional coordinates on a wafer, in general, any arrangement (random or not) of $(x_i, y_i)$ positional coordinates can be used for the wafers.

As shown, once the TP component 120 completes all iterations, modeling engine 122 of the TP component 120 uses the measured sensor values 220 to generate a plurality of prediction models 206, one prediction model for each positional coordinate. In one embodiment, the TP component 120 maps (or fits) a function (e.g., using a least squares analysis, robust linear fit, ridge regression, or other regression technique, etc.) to the plurality of measured sensor values and uses the mapped function to build a prediction model for each positional coordinate. In one example, the function is based on a characteristic of the plurality of measured sensor values. For example, depending on the dataset, the TP component 120 may map a linear or non-linear function to the measured sensor values. In one embodiment, the TP component 120 builds a prediction model 206 for each measured sensor value at each positional coordinate. For example, if there are forty-nine positional coordinates and two measured sensor values for thickness and temperature at each positional coordinate, the TP component would build ninety-eight prediction models (e.g., forty-nine for predicting thickness of the wafer, and forty-nine for predicting temperature of the wafer).

Once the TP component 120 generates the plurality of prediction models 206, the prediction models 206 can be stored (e.g., in storage system 116) until needed by the prediction engine 124. For example, as shown, once the prediction engine 124 receives a user-specified set of input parameters 208, the prediction engine generates a predicted topography map for the product for the user-specified set of input parameters 208. To generate the topography map, the prediction engine 124 determines, for each of the plurality of prediction models 206, a respective predicted value for each respective positional coordinate of the product. The prediction engine 124 then interpolates, using one of the interpolation techniques 210, between the positional coordinates to determine a predicted value for any positional coordinates not included in the plurality of positional coordinates. Such interpolation techniques can be used between the positional coordinates to smooth the predicted values between neighboring positional coordinates and increase the prediction quality.

The prediction engine 124 can select any of several interpolation techniques 210 to perform interpolation. Examples of such interpolation techniques 210 include, but are not limited to, inverse distance weighting (IDW) interpolation, Kriging interpolation, Natural Neighbor interpolation, Spline interpolation, and the like. In one embodiment, the prediction engine 124 selects an interpolation technique based on the physical property of the output. For example, in one embodiment, if the prediction engine 124 is predicting the temperature of the product, the prediction engine 124 selects Spline interpolation method to perform interpolation. In another embodiment, if the prediction engine 124 is predicting thickness of the product, the prediction engine 124 selects Kriging interpolation method to perform interpolation. The prediction engine 124 then generates a graphical representation of the topography map 212 based on the determined predicted values and the interpolated predicted values.

Figure 3:
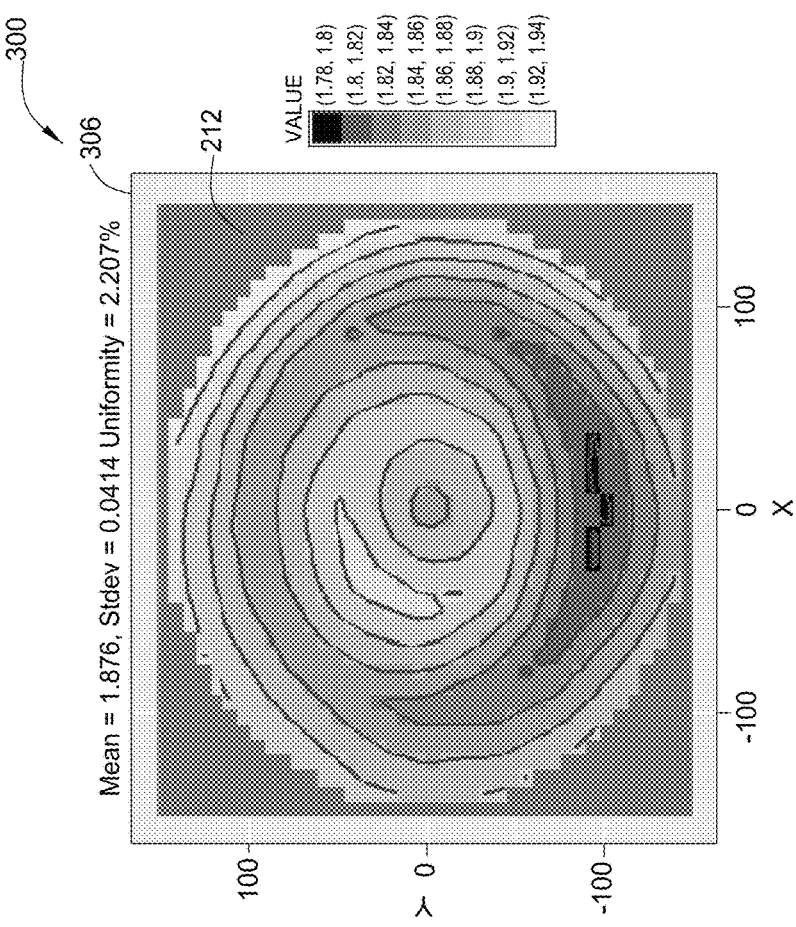
FIG. 3 illustrates an example user interface for showing a predicted topography map for a set of user-specified input parameters, in accordance with embodiments of the present disclosure.

FIG. 3 illustrates an example graphical user interface (GUI) 300 for a predicted topography map, according to one embodiment. In one embodiment, GUI 300 is an example of user interface 104 described relative to FIG. 1. As shown, GUI 300 includes a panel 302 and a panel window 306. Panel 302 includes a plurality of process parameters 304A-E that can be used to configure a manufacturing process of a product. For example, in this embodiment, panel 302 includes a process parameter 304A for radio frequency (RF), process parameter 304B for power (DC), process parameter 304C for a gas flow rate, process parameter 304D for percent capacitance, and a process parameter 304E for spacing (e.g., between a wafer and target). Of course, one of ordinary skill in the art will recognize that such examples are provided for illustrative purposes only, and more generally, embodiments may be configured to use any number and/or any type of process parameters.

As shown, panel 306 includes a graphical representation of the topography map 212. In one embodiment, the graphical representation of the topography map 212 is provided as a color coded two-dimensional picture to a user, via user interface 104, along with statistics such as mean, standard deviation, uniformity, topographical metrics, etc., relating to predicted topography map 212. However, in general, the topography map 212 can be graphically represented in other formats (e.g., shading, grayscale, etc.). As also shown, panel 302 includes sliders for adjusting values of parameters 304A-E between their respective minimum and maximum values. In one embodiment, the wafer topography map 212 in panel 306 is automatically recomputed and re-visualized every time a parameter is changed via the sliders in panel 302. Doing so in this manner allows a user to immediately determine the impact, as a result of adjusting process parameters, on the topography of a wafer. Note that the example GUI 300 illustrates one possible presentation of process parameters and a topography map. More generally, one of ordinary skill in the art will recognize that the GUI 300 may include different configurations of the process parameters, different configurations of the topography map, additional (or less) information fields, etc.

Figure 4:
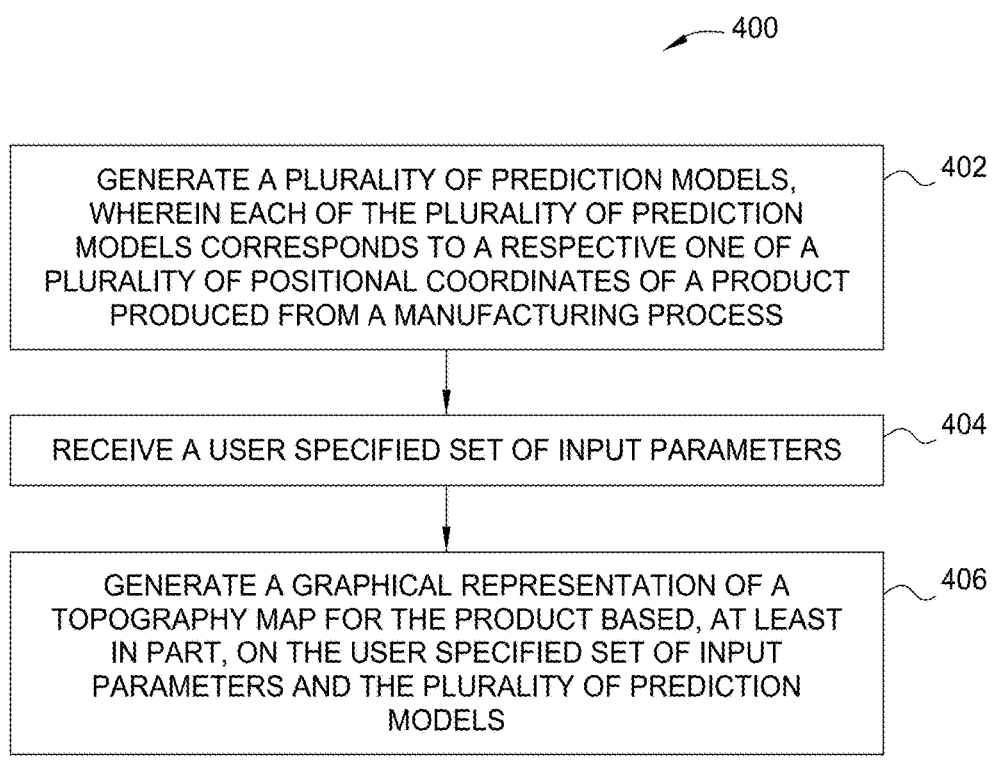
FIG. 4 is a flow diagram illustrating a method for predicting the topography of a product produced from a manufacturing process, in accordance with embodiments of the present disclosure.

FIG. 4 is a flow diagram of a method 400 for predicting the topography of a product produced from a manufacturing process, according to one embodiment. As shown, the method begins at block 402, where a TP component 120 generates a plurality of prediction models. As described above, each of the plurality of prediction models corresponds to a respective one of a plurality of positional coordinates of a product produced from a manufacturing process. At block 404, the TP component 120 receives a user specified set of input parameters. In some embodiments, the user specified set of input parameters can include any of process recipe settings, sensor and tool parameters, pre-process metrology information (e.g., pre-process topography information), upstream process information (e.g., process parameters or post-process metrology information), etc. At block 406, the TP component generates a graphical representation of a topography map for the product based, at least in part, on the user specified set of input parameters and the plurality of prediction models.

Figure 5:
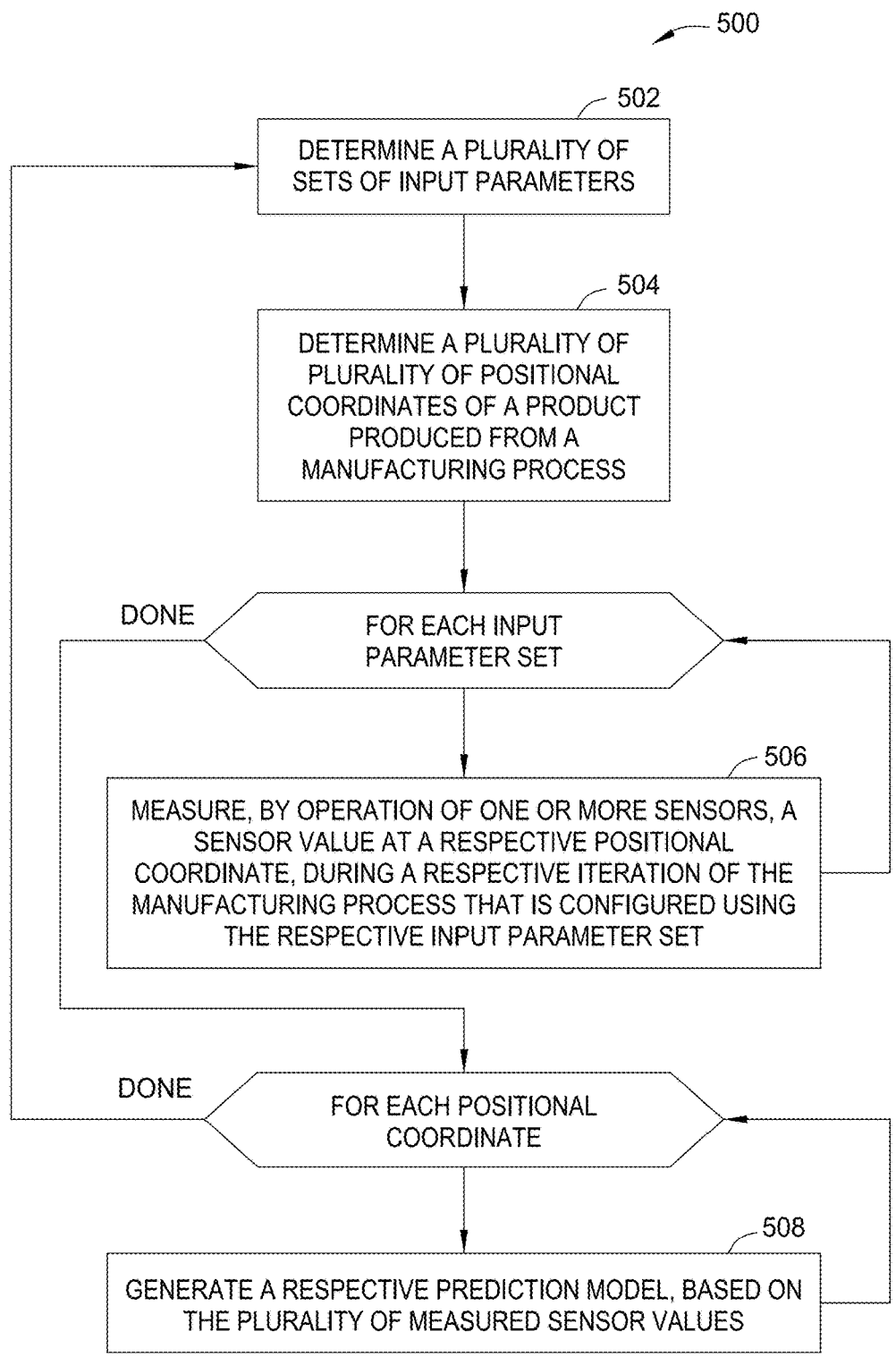
FIG. 5 is a flow diagram illustrating a method for generating a plurality of prediction models, in accordance with embodiments of the present disclosure.

FIG. 5 is a flow diagram of a method 500 for generating a plurality of prediction models, according to one embodiment. As shown, the method begins at block 502, where a TP component 120 determines a plurality of sets of input parameters. For example, as mentioned above, in one embodiment, the TP component 120 determines the number of sets of input parameters based on the processing complexity, tool complexity, etc. At block 502, the TP component 120 determines (e.g., based on processing complexity, tool complexity, desired model accuracy, etc.) a number and/or location of positional coordinates of a product produced from manufacturing process. For each input parameter set, the TP component 120 then measures, by operation of one or more sensors, a sensor value at a respective positional coordinate, during a respective iteration of the manufacturing process that is configured using the respective input parameter set (block 506). In one embodiment, as noted above, before each respective iteration of the manufacturing process, the TP component 120 can vary, in the respective set of input parameters, at least one parameter value from a parameter value in a previous respective set of input parameters before measuring the sensor value at each respective positional coordinate. At block 508, the TP component 120 then generates, for each positional coordinate, a respective prediction model, based on the plurality of measured sensor values.

Figure 6:
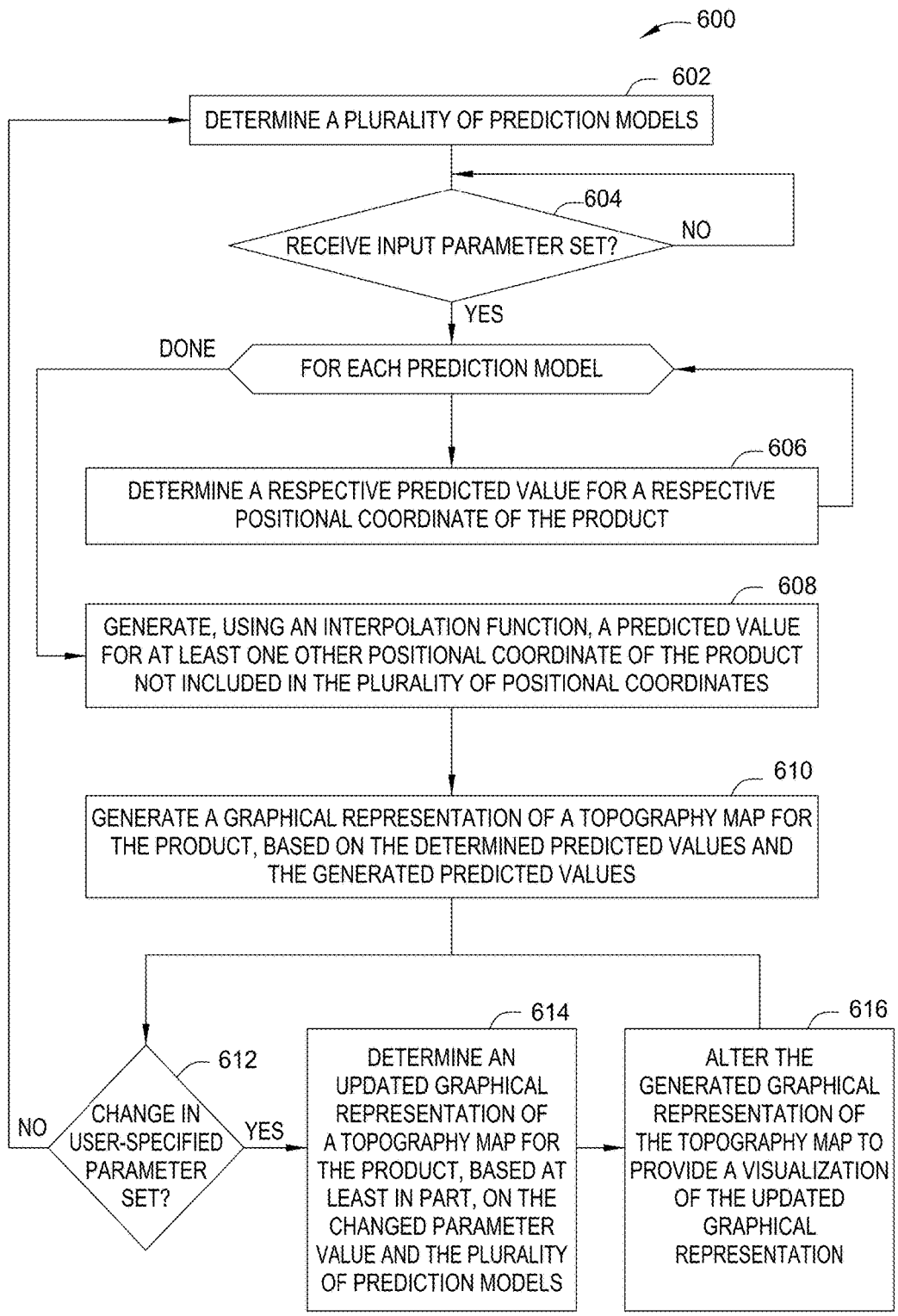
FIG. 6 is a flow diagram illustrating a method for generating a graphical representation of a topography map for a product produced from a manufacturing process, in accordance with embodiments of the present disclosure.

FIG. 6 is a flow diagram of a method 600 for generating a topography map for a product produced from a manufacturing process, according to one embodiment. As shown, the method begins at block 602, where a TP component 120 determines (e.g., by performing method 500 or other techniques described herein) a plurality of prediction models. At block 604, the TP component 120 determines whether a set of user-specified input parameters (e.g., process recipes, sensor and tool parameters, pre-process/post-process metrology information, etc.) has been received. If not, the TP component 120 remains at block 604. However, if the TP component 120 determines that a set of input parameters has been received, the TP component 120 determines, for each prediction model, a respective predicted value for a respective positional coordinate of the product (block 606). For example, as mentioned above, each predicted value corresponds to a predicted measurement of a physical property of the product (e.g., thickness, resistivity, temperature, surface roughness, etc.).

At block 608, the TP component 120 then generates, using an interpolation function, a predicted value for at least one other positional coordinate of the product not included in the plurality of positional coordinates. At block 610, the TP component generates a graphical representation of a topography map for the product, based on the determined predicted values and the generated predicted values. As mentioned above, the graphical representation of the topography map can be displayed to a user via a GUI, such as GUI 300.

At block 612, the TP component 120 determines whether there has been a change in at least one parameter value of the user-specified input parameters. If so, the TP component determines an updated graphical representation of a topography map for the product based, at least in part, on the changed parameter value and the plurality of prediction models (block 614). The TP component 120 then alters the generated graphical representation of the topography map to provide a visualization of the updated graphical representation (block 616), before returning to block 612. In one embodiment, the TP component 120 determines for at least one continually adjustable input parameter of the user-specified input parameters, a plurality of updated graphical representations of the topography map for the product based in part on the value of the adjustable input parameter and the plurality of prediction models. The TP component 120 can continually alter the generated graphical representation of the topography map to provide visualizations of the updated graphical representations.

Doing so in this manner allows a user to determine, in real-time, any potential impact of adjusting states, such as recipe inputs, on the product. For example, as mentioned above with reference to FIG. 3, a user can use sliders to adjust values of an input parameter between its minimum and maximum values (e.g., corresponding to its actuation capability). As the slider is moved, the TP component 120 can continually adjust the graphical representation in real-time to indicate the impact of the changing input value, which allows the user to investigate and determine an optimal set of inputs to achieve a particular topography (without having to rely on post-process methods to determine impact to the topography).

Figure 7:
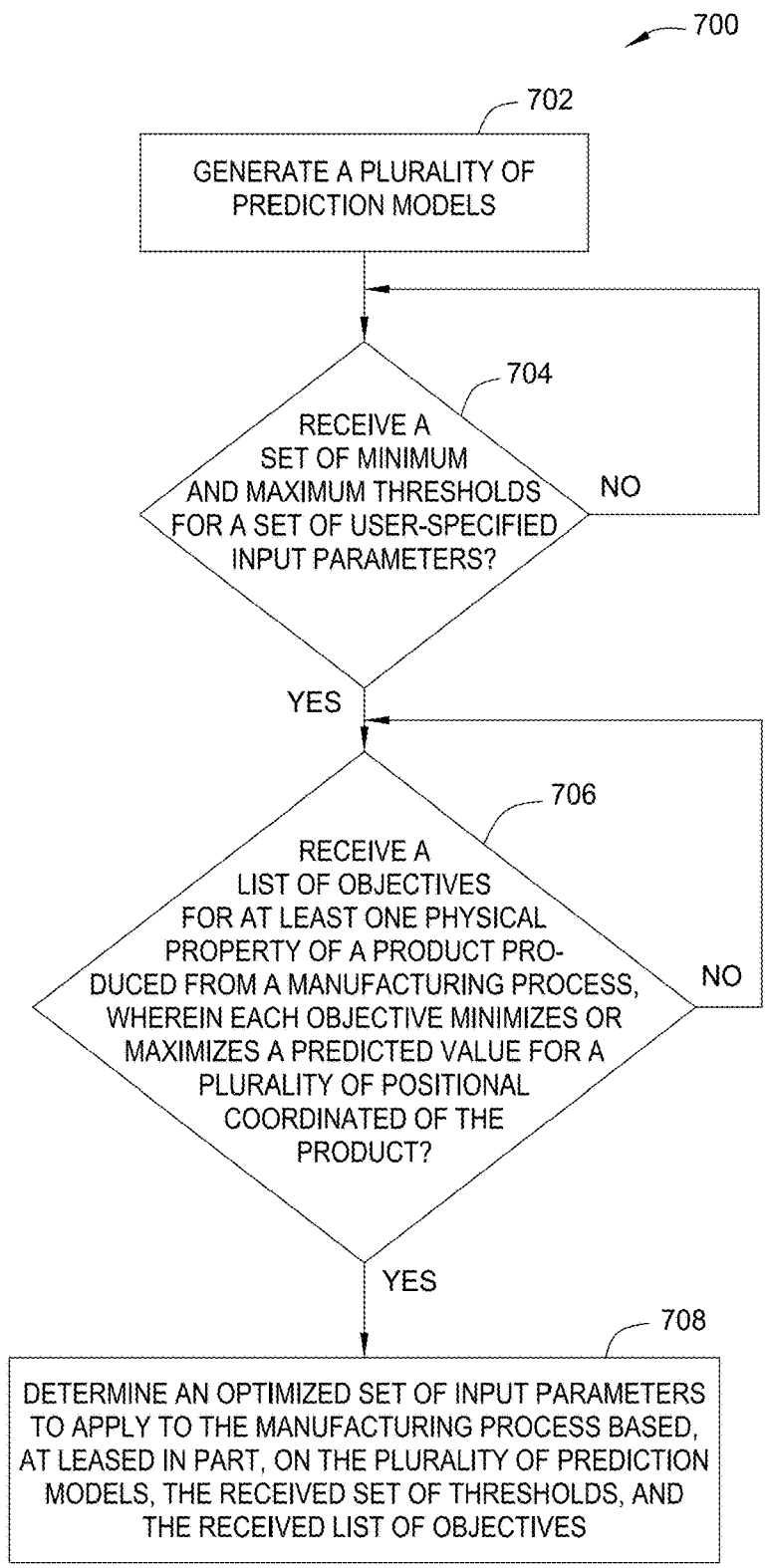
FIG. 7 is a flow diagram illustrating a method for determining an optimized set of input parameters to apply to a manufacturing process, in accordance with embodiments of the present disclosure.

As mentioned above, the techniques presented herein can also provide an optimal set of input parameters to apply to a manufacturing process given a set of input and output constraints and list of objectives. FIG. 7 is a flow diagram of a method 700 for determining an optimized set of input parameters to apply to a manufacturing process, according to one embodiment. As shown, the method begins at block 702, where a TP component 120 generates (e.g., using method 500 in FIG. 5 or other techniques described herein) a plurality of prediction models. As mentioned above, in some embodiments, the TP component generates a prediction model for each measured sensor value (measured physical property of a product) at each positional coordinate.

At block 704, the TP component 120 determines whether a set of minimum and maximum thresholds for a set of user-specified input parameters has been received. For example, in one embodiment, the set of minimum and maximum thresholds (or constraints) could include at least one of maximum and minimum values corresponding to actuation capability of the process tools, granularity of adjustment capability, weighting indicating parameter adjustment preference, and the like. If the TP component 120 determines that the set of input parameters has been received, the TP component 120 determines whether a list of objectives for at least one physical property of a product produced from a manufacturing process has been received. In one embodiment, each objective in the list of objectives has a goal to minimize or maximize a predicted value for a plurality of positional coordinates of the product. For example, in one case, the TP component 120 could receive a list of two objectives, where the first objective's goal is to minimize thickness uniformity on the wafer and the second objective's goal is to maximize (mean) resistivity on the wafer. In general, however, the TP component 120 can receive any number and/or other list of objectives.

Further, in some embodiments, the TP component 120 could receive a weighting parameter for each objective. The weighting parameter, in general, indicates to the TP component 120 whether the respective objective should take precedence over another objective. For example, using the example above, in one embodiment, the TP component 120 can receive a first weighting value for the objective to minimize thickness uniformity and a second weighting value for the objective to maximize resistivity, where the first weighting indicates to the TP component 120 that the objective to minimize thickness uniformity should take precedence over the objective to maximize mean resistivity. As a reference example, in one embodiment, if the first objective has a weighting value of ten and the second objective has a weighting value of one, such weighting would indicate to the TP component 120 that achieving the first objective is ten times as important as achieving the second objective.

If the TP component 120 determines that the list of objectives has been received, the TP component 120 then determines an optimized set of input parameters to apply to the manufacturing process based, at least in part, on the plurality of prediction models, the received set of thresholds, and the received list of objectives (block 708). For example, upon receiving the list of objectives, the TP component 120 can build a cost function subject to the constraints (e.g., thresholds and objectives) and perform multi-objective optimization (e.g., using techniques such as linear programming, Monte Carlo simulation, evolutionary algorithms, or any multi-objective optimization algorithm) to find the optimal set of input parameters that satisfies all the constraints (e.g., achieves each objective in the list of objectives, is within the set of thresholds, etc.).

Figure 8A:
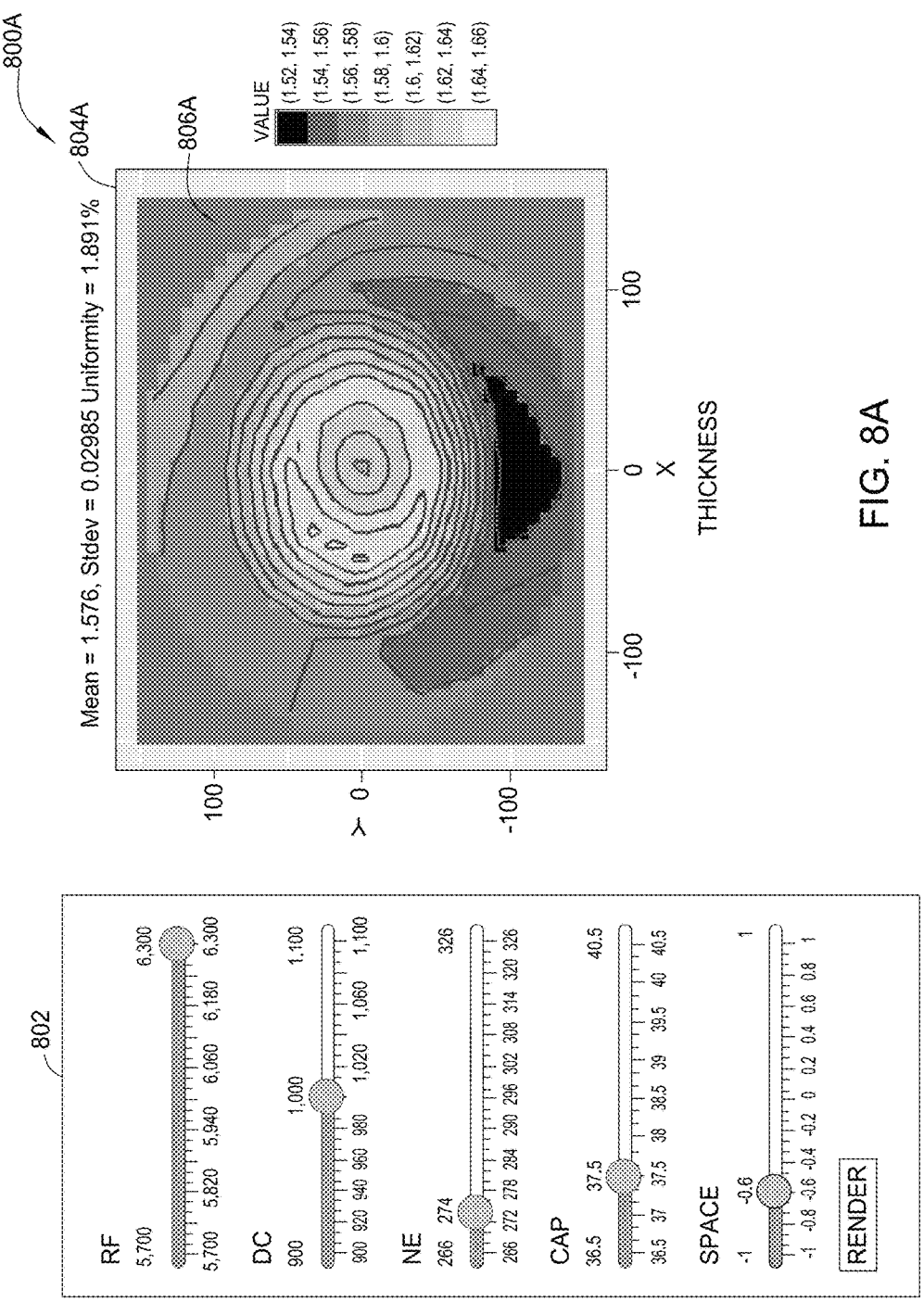
FIGS. 8A-8B illustrate example user interfaces for showing a determined optimized set of input parameters, in accordance with embodiments of the present disclosure.
Figure 8B:
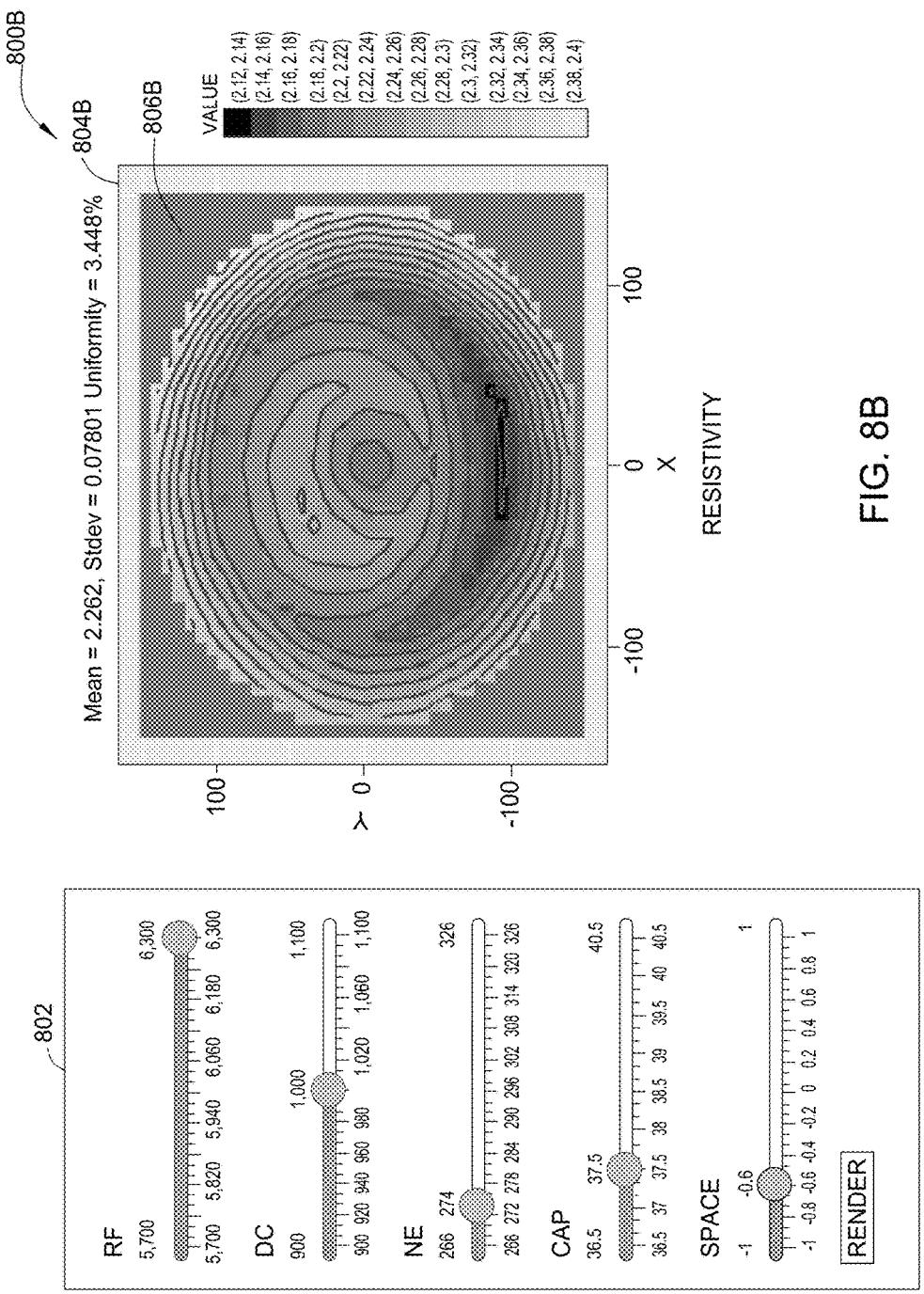

Once the TP component 120 finds the optimal set of input parameters, the TP component 120 can display the optimal set of input parameters and the topography maps for each obtained objective to a user (e.g., via user interface 104). For example, as illustrated in GUI 800A of FIG. 8A, in one embodiment, the TP component 120 can display the optimized set of input parameters in a panel 802, and the topography map 806A showing the minimized thickness uniformity for the wafer in panel 804A. Additionally, as illustrated in GUI 800B of FIG. 8B, the TP component 120 can display the topography map 806B showing the maximized mean resistivity for the wafer in panel 804B. In this embodiment, GUIs 800A-B also include sliders for each of the optimized set of parameters to allow the user to adjust the parameters to determine in real-time the impact to the topography maps 806A and 806B. Note, however, that the above presentation of the optimized set of parameters in panel 802 and topography maps 806A and 806B represent merely one example of a configuration that can be presented to a user. More generally, one of ordinary skill in the art will recognize that the GUIs 800A-B may include different configurations of the process parameters, different configurations of the topography maps, additional (or less) information fields, etc.

Figure 9:
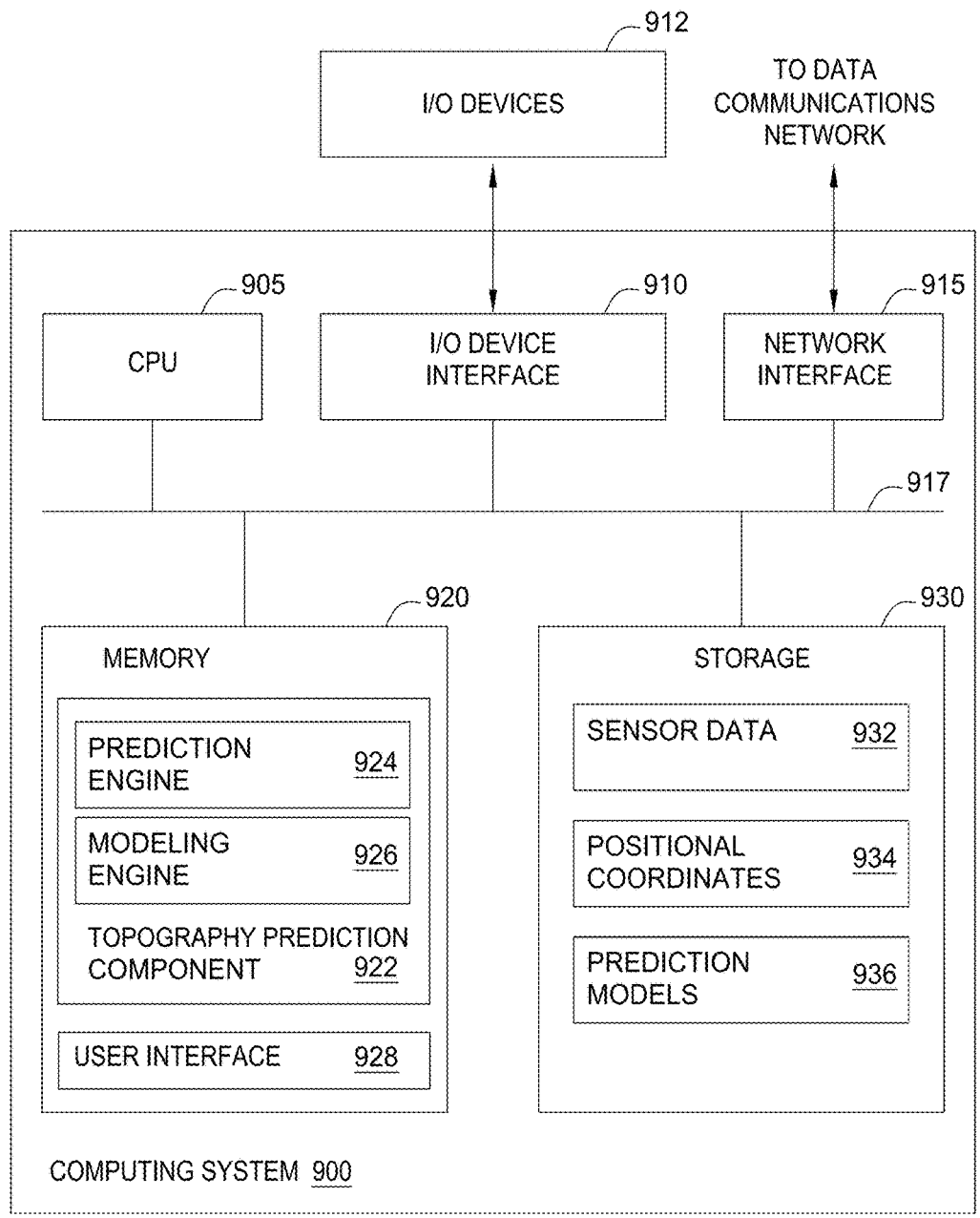
FIG. 9 illustrates an example of a computing system configured with a topography prediction component, in accordance with embodiments of the present disclosure.

FIG. 9 illustrates a computing system 900 configured to predict the topography of a product produced from a manufacturing process, according to an embodiment. As shown the computing system 900 includes, without limitation, a central processing unit (CPU) 905, a network interface 915, a memory 920, and storage 930, each connected to a bus 917. The computing system 900 may also include an I/O device interface 910 connecting I/O devices 912 (e.g., keyboard, mouse, and display devices) to the computing system 900. Further, in context of this disclosure, the computing elements shown in the computing system 900 may correspond to a physical computing system (e.g., a system in a data center) or may be a virtual computing instance executing within a computing cloud.

The CPU 905 retrieves and executes programming instructions stored in the memory 920 as well as stores and retrieves application data residing in the memory 920. The interconnect 917 is used to transmit programming instructions and application data between CPU 905, I/O devices interface 910, storage 930, network interface 915, and memory 920. Note, CPU 905 is included to be representative of a single CPU, multiple CPUs, a single CPU having multiple processing cores, and the like. Memory 920 is generally included to be representative of a random access memory. Storage 930 may be a disk drive storage device. Although shown as a single unit, storage 930 may be a combination of fixed and/or removable storage devices, such as fixed disc drives, removable memory cards, or optical storage, network attached storage (NAS), or a storage area-network (SAN).

Illustratively, the memory 920 includes a TP component 922 and a user interface 928. The TP component 922 includes a prediction engine 924 and a modeling engine 926. The storage 930 includes sensor data 932, positional coordinates 934 and prediction models 936. Further, although not shown, memory 920 can also include a process controller (e.g., process controller 106), one or more process control applications (e.g., process control applications 108), one or more predictive applications, etc. In some embodiments, each of the sensor data 932, positional coordinates 934 and prediction models 936 may also be stored within memory 920.

In one embodiment, the TP component 922 generates (via modeling engine 926) a plurality of prediction models for a plurality of coordinate points of a product to be produced by a manufacturing process. Once the TP component 922 receives a set of user-defined inputs (e.g., via user interface 928), the TP component 922 (via prediction engine 924) generates a topography map for the product based, at least in part, on the plurality of prediction models 936. The generated topography map is then displayed to a user, via the user interface 928.

Alternatively, or additionally, in another embodiment, after generating the plurality of models, the TP component 922 receives a set of input and output constraints for a set of parameters and a list of objectives. The TP component 922 then determines an optimal set of input parameters based on the plurality of prediction models, input/output constraints, and list of objectives.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C#, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:
1. A method, comprising:
  generating a plurality of prediction models, wherein each of the plurality of prediction models corresponds to a different one of a plurality of positional coordinates of a product produced from a manufacturing process, and comprising, for each of the plurality of prediction models:
    for each of a plurality of sets of input parameters, performing a different iteration of the manufacturing process using the set of input parameters, and measuring, by operation of one or more sensor devices, a sensor value at the corresponding positional coordinate, during the iteration of the manufacturing process that is configured using the set of input parameters; and
    generating a prediction model for the corresponding positional coordinate, based on the plurality of measured sensor values; and
  generating a graphical representation of a topography map for the product for a user-specified set of input parameters, comprising:

determining, for each of the plurality of prediction models, a predicted value for the corresponding positional coordinate of the product; and generating, using an interpolation function, a predicted value for at least one other positional coordinate of the product not included in the plurality of positional coordinates.

2. The method of claim 1, further comprising, before each iteration of the manufacturing process:

varying, in the respective set of input parameters, at least one parameter value from a parameter value in a previous respective set of input parameters before measuring the sensor value at the corresponding positional coordinate.

3. The method of claim 1, wherein generating the prediction model for the corresponding positional coordinate comprises:

mapping a function to the plurality of measured sensor values, wherein the function is based on a characteristic of the plurality of measured sensor values; and using the mapped function to generate a prediction model for the different one of the plurality of positional coordinates.

4. The method of claim 1, wherein the sensor value corresponds to a measurement of at least one physical property of the product, and wherein the predicted value corresponds to a predicted measurement of the at least one physical property of the product.

5. The method of claim 4, wherein using the interpolation function comprises:

selecting the interpolation function from a plurality of interpolation functions, based on the at least one physical property of the product, wherein the plurality of interpolation functions comprise at least one of an inverse distance weighting (IDW) function, a Kriging function, a natural neighbor function, or a Spline function; and using the selected interpolation function to predict the measurement of the at least one physical property of the product at the at least one other positional coordinate.

6. The method of claim 5, wherein selecting the interpolation function from the plurality of interpolation functions comprises:

selecting the Kriging function if thickness is the physical property of the product; and selecting the Spline function if temperature is the physical property of the product.

7. The method of claim 1, further comprising:

receiving a set of minimum and maximum thresholds for the input parameters;

receiving a list of objectives for at least one physical property of the product, wherein each objective in the list minimizes or maximizes the predicted values for the plurality of positional coordinates of the product; and determining an optimized set of input parameters to apply to the manufacturing process, based on the plurality of prediction models, the received set of thresholds, and the received list of objectives, wherein the optimized set of input parameters achieves each objective in the list of objectives.

8. The method of claim 7, wherein the at least one physical property for the product comprises at least one of thickness, resistivity, or surface roughness.

9. The method of claim 1, further comprising:

determining for at least one continually adjustable input parameter of the user-specified set of input parameters, a plurality of updated graphical representations of the topography map for the product based in part on a value of the adjustable input parameter and the plurality of prediction models; and continually altering the generated graphical representation of the topography map to provide visualizations of the updated graphical representations.

10. The method of claim 1, wherein the product comprises a semiconductor wafer, and wherein the manufacturing process comprises a semiconductor manufacturing process used to deposit one or more films on the semiconductor wafer.

11. The method of claim 10, wherein the semiconductor manufacturing process used to deposit the one or more films comprises one of a plasma vapor deposition (PVD) process, a chemical vapor deposition (CVD) process, or an atomic layer deposition (ALD) process.

12. A non-transitory computer-readable medium containing computer program code that, when executed by a processor, performs an operation comprising:

generating a plurality of prediction models, wherein each of the plurality of prediction models corresponds to a different one of a plurality of positional coordinates of a product produced from a manufacturing process, and comprising, for each of the plurality of prediction models:

for each of a plurality of sets of input parameters, performing a different iteration of the manufacturing process using the set of input parameters, and measuring, by operation of one or more sensor devices, a sensor value at the corresponding positional coordinate, during the iteration of the manufacturing process that is configured using the set of input parameters; and generating a prediction model for the corresponding positional coordinate, based on the plurality of measured sensor values; and generating a graphical representation of a topography map for the product for a user-specified set of input parameters, comprising:

determining, for each of the plurality of prediction models, a predicted value for the corresponding positional coordinate of the product; and generating, using an interpolation function, a predicted value for at least one other positional coordinate of the product not included in the plurality of positional coordinates.

13. The non-transitory computer-readable medium of claim 12, wherein the sensor value corresponds to a measurement of at least one physical property of the product, and wherein the predicted value corresponds to a predicted measurement of the at least one physical property of the product.

14. The non-transitory computer-readable medium of claim 13, wherein using the interpolation function comprises:

selecting the interpolation function from a plurality of interpolation functions, based on the at least one physical property of the product, wherein the plurality of interpolation functions comprise at least one of an inverse distance weighting (IDW) function, a Kriging function, a natural neighbor function, or a Spline function; and using the selected interpolation function to predict the measurement of the at least one physical property of the product at the at least one other positional coordinate.

15. The non-transitory computer-readable medium of claim 14, wherein selecting the interpolation function from the plurality of interpolation functions comprises:
   selecting the Kriging function if thickness is the physical property of the product; and
   selecting the Spline function if temperature is the physical property of the product.

16. The non-transitory computer-readable medium of claim 12, further comprising:
   receiving a set of minimum and maximum thresholds for the input parameters;
   receiving a list of objectives for at least one physical property of the product, wherein each objective in the list minimizes or maximizes the predicted values for the plurality of positional coordinates of the product; and
   determining an optimized set of input parameters to apply to the manufacturing process, based on the plurality of prediction models, the received set of thresholds, and the received list of objectives, wherein the optimized set of input parameters achieves each objective in the list of objectives.

17. The non-transitory computer-readable medium of claim 12, further comprising:
   determining for at least one continually adjustable input parameter of the user-specified set of input parameters, a plurality of updated graphical representations of the topography map for the product based in part on a value of the adjustable input parameter and the plurality of prediction models; and
   continually altering the generated graphical representation of the topography map to provide visualizations of the updated graphical representations.

18. A manufacturing system, comprising:
   a plurality of tools for manufacturing one or more semiconductor devices;
   at least one processor; and
   a memory containing a program that, when executed by the at least one processor, performs an operation comprising:
      generating a plurality of prediction models, wherein each of the plurality of prediction models corresponds to a different one of a plurality of positional coordinates of a semiconductor wafer produced from a manufacturing process, and comprising, for each of the plurality of prediction models:
         for each of a plurality of sets of input parameters, performing a different iteration of the manufacturing process using the set of input parameters, and measuring, by operation of one or more sensor devices, a sensor value at the corresponding positional coordinate, during the iteration of the manufacturing process that is configured using the set of input parameters, wherein the sensor value corresponds to a measurement of at least one physical property of the semiconductor wafer; and
         generating a prediction model for the corresponding positional coordinate, based on the plurality of measured sensor values; and
      generating a graphical representation of a topography map for the semiconductor wafer for a user-specified set of input parameters, comprising:
         determining, for each of the plurality of prediction models, a predicted value for the corresponding positional coordinate of the semiconductor wafer; and
         generating, using an interpolation function, a predicted value for at least one other positional coordinate of the semiconductor wafer not included in the plurality of positional coordinates, wherein the predicted value corresponds to a predicted measurement of the at least one physical property of the semiconductor wafer.

19. The manufacturing system of claim 18, wherein using the interpolation function comprises:
   selecting the interpolation function from a plurality of interpolation functions, based on the at least one physical property of the semiconductor wafer, wherein the plurality of interpolation functions comprise at least one of an inverse distance weighting (IDW) function, a Kriging function, a natural neighbor function, or a Spline function; and
   using the selected interpolation function to predict the measurement of the at least one physical property of the semiconductor wafer at the at least one other positional coordinate.

20. The manufacturing system of claim 18, wherein the operation further comprises:
   determining for at least one continually adjustable input parameter of the user-specified set of input parameters, a plurality of updated graphical representations of the topography map for the semiconductor wafer based in part on a value of the adjustable input parameter and the plurality of prediction models; and
   continually altering the generated graphical representation of the topography map to provide visualizations of the updated graphical representations.

\* \* \* \* \*